United States Patent [19]
Campbell, Jr.

[11] 3,883,970
[45] May 20, 1975

[54] WORK-SHIFT INDICATOR

[76] Inventor: Leonard Earl Campbell, Jr., 460 56th Ave., Meridian, Miss. 39301

[22] Filed: Dec. 14, 1973

[21] Appl. No.: 424,857

Related U.S. Application Data

[63] Continuation of Ser. No. 304,715, Nov. 8, 1972, abandoned.

[52] U.S. Cl. .................. 40/110; 40/118; 35/24 B
[51] Int. Cl. .......................................... G09d 1/00
[58] Field of Search ............ 35/24 R, 24 B; 40/110, 40/118, 109, 107

[56] References Cited
UNITED STATES PATENTS

| | | | |
|---|---|---|---|
| 216,975 | 7/1879 | Robinson | 40/109 |
| 995,466 | 6/1911 | Jones | 40/118 X |
| 2,029,843 | 2/1936 | Topin | 40/118 |
| 2,586,890 | 2/1952 | Voss | 40/110 |
| 2,649,790 | 8/1953 | Johnson | 35/24 B |
| 3,594,926 | 7/1971 | Reed | 35/24 B |

FOREIGN PATENTS OR APPLICATIONS

| | | | |
|---|---|---|---|
| 321,573 | 11/1929 | United Kingdom | 40/110 |

Primary Examiner—John H. Wolff
Attorney, Agent, or Firm—Alvin Edward Moore

[57] ABSTRACT

A work-shift indicator mostly printed on paper or cardboard having: a calender-like portion, indicating the months, dates and days of the week in repetitively arranged work-shift cycles - cycles of 8 weeks (56 linearly arranged date spaces exampled): and beginning hours of the shifts of each group on each day being also linearly and repetitively indicated - in spaces linearly and indicatingly connected with said date spaces, each work-shift-hour space thus being linearly indicated by a space representing a month, date and day of the week. The work-shift groups are indicated by number and color and optionally by goemetric symbols, of aid to the color-blind. A space is provided for names or representative numbers of the workers. An optional, preferred form of the invention has the indicia linearly and repetitively printed on the two sides of a card to be carried in a wallet or purse and has a revolvable band, encompassing the card, on which group-indicating indicia and figures indicating work-shift starting-hours are marked.

5 Claims, 5 Drawing Figures

PATENTED MAY 20 1975  3,883,970

_WORK-SHIFT INDICATOR_

CROSS REFERENCE TO RELATED APPLICATION

This application is a continuation of application Ser. No. 304,715, filed on Nov. 8, 1972 now abandoned.

There is a need for eliminating or greatly reducing the numerous thousands of work-shift numbers and alphabetical letters made each year by foremen and workers in every fair-sized manufacturing plant in the attempt to keep some sort of record and somewhat chaotic indication of the numerous shift changes and workers involved. Much confusion and absenteeism is caused by the present lack of a simple, adequate system for such data. A simple printed schedule, wherein it is easy to follow linearly arranged spaces from the beginning hours of a shift to shifts of other workers with whom an exchange of shifts could be made, would be of great value to the shift workers. And advertising data optionally could be placed on the master placard and individual cards.

The examples of the invention illustrated in the drawings pertain to the usual four groups of swing-shift workmen in a plant functioning around-the-clock, seven days a week - each group working eight hours per day in eight-hour shifts, with an average of two days a week off duty. These "off" days are not regular.

An object of the invention is to provide means for each person to quickly ascertain on any given day an individual (or group of workmen) days of work with another individual. Another object is to provide means for the person desiring to exchange shifts on a particular day to quickly ascertain which shift each individual (or group) is working that day. These and other objects of this invention will be more fully apparent from the following specification and the accompanying drawings.

In these drawings:

FIG. 1 is a plan view of the form of the invention with shift groups indicated by numerals and colors and optionally by names (or identifying numbers) on one side of a sheet of paper;

FIG. 2 is a plan view of a second form of the invention, illustrating indicia on one side of a card;

FIG. 3 is a plan view of the back side of the card of FIG. 2;

FIG. 4 is a plan view, partly broken away, illustrating various alternative, geometric-symbol forms of the shift-indicating indicia; and FIG. 5 is a plan view, partly broken away, illustrating other alternative arrangements of the shift-indicating numerals and colors.

Figures 1, 2, 3, 4, 5:
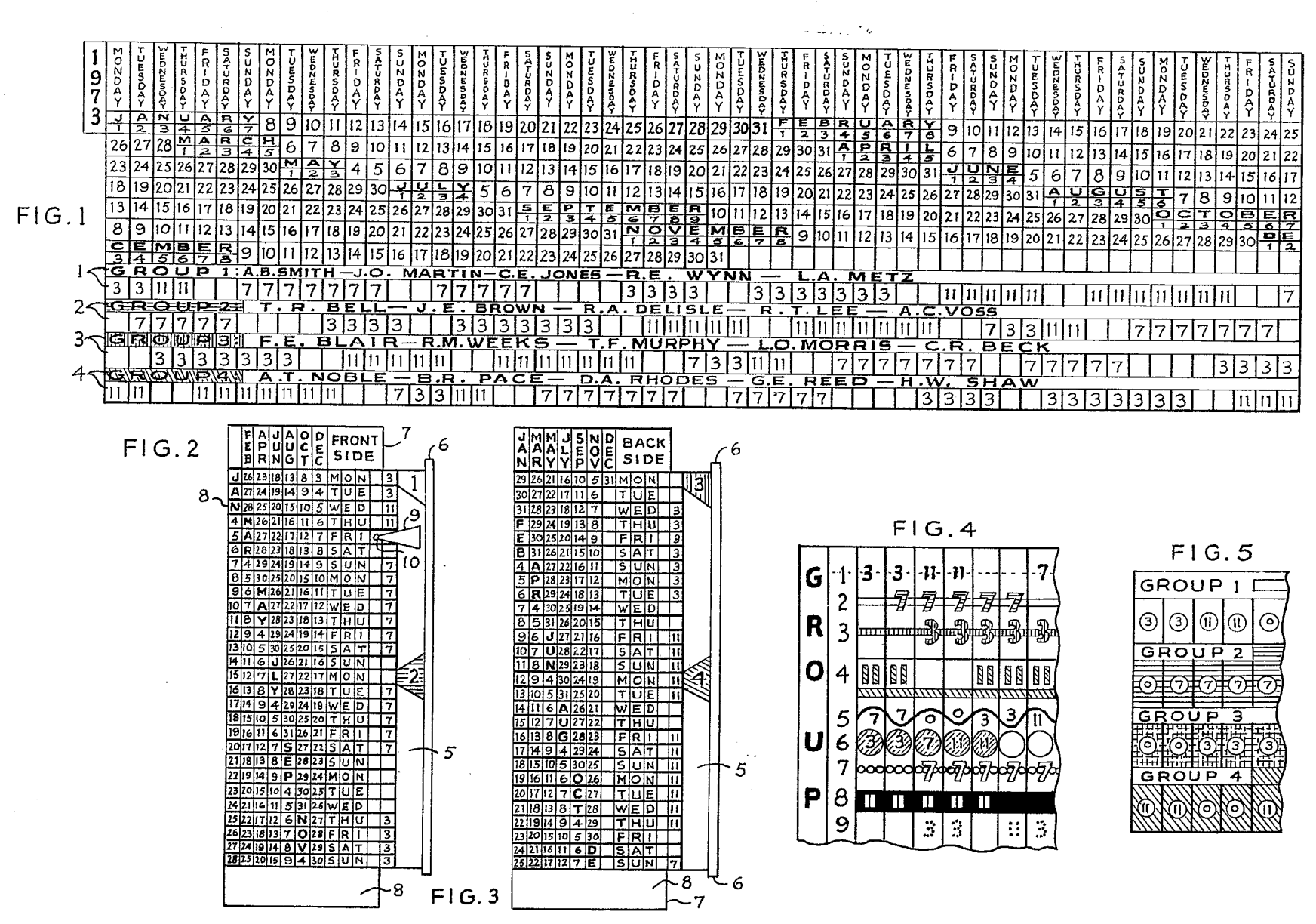

Two main forms of the invention are illustrated in FIGS. 1 to 3. The type shown in FIG. 1, calibrated for a given year, changed each year, may be utilized both as a master shift indicator on a large sheet of paper or cardboard that is posted as a placard in a public place of the factory or the like and also as a much smaller card or stiff sheet of paper, printed with the same indicia as on the placard, that is, folded and individually carried by each worker (for example in a billfold, pocketbook or pocket). And the optional inventive form illustrated in FIGS. 2 and 3 is used by the worker, with adjustment at times of part of its indicia with respect to changes of shift groups noted by the foreman on the main placard of FIG. 1 or when a new placard, due to major shift changes, is made.

As indicated in FIG. 1 each of the shifts (groups of workmen), here exampled as four in number, has a pair of placard bars or stripes (1, 2, 3 and 4). The upper one of each of these pairs of bars has group-identification data, including the group number and color differentiation. For example: Group 1 is indicated by its white upper bar; Group 2 by blue indication; Group 3 by the red block; and Group 4 by the green stripe. The lower bar of each group has numerals that indicate the time of reporting to work for beginning that group's shift, if any, on each of the days indicated in the calendar-like upper part of the placard, comprising repetitive lines fifty-six spaces each, each indicating a month, date and day of the week.

As exampled, the placard is designed for around-the-clock, seven-day continual shifts and for the usual five-day work week with two days off for each worker, and with an eight-week (fifty-six-day) cycle of shifts. Therefore, the placard has fifty-six vertical bars for the fifty-six-day cycles. Each of these vertical bars is indicated at its top by a day of the week. The months are indicated in horizontal bars above the first few days of each month. These date indicia are linearly indicated for each fifty-six day cycle, and then successively and linearly indicated for successive cycles with notation of successive months in appropriate short bars.

A foreman or a shift worker uses this placard to ascertain the hours of shift or off days for any workman on any day.

For example, a workman in Group 1 who desires to exchange his three-to-eleven-o'clock evening shift hours on the first of January with some other worker would note on his folded small copy of the placard that Groups 2 and 3 are off duty that day; and if he is in a large plant, having many workmen, he might put a note of his wish for an exchange with a worker of one of Groups 2 and 3 on the bulletin board, below the placard (with or without his telephone number). In a very small plant he probably would know the names of the workers on the various shifts, and thus would get in touch with an appropriate workman without a note. In a small plant the names of all the shift workers optionally would be written in the color-indicated bars, as indicated in FIG. 1. Optionally, such writing of names may be done for a large plant by widening the space containing each group number and color block. Or worker's numbers may be substituted for the names of FIG. 1; and near the placard a roster of all shift workmen might be posted. If no one in Groups 2 and 3 is willing to swap for some other day's shift, the workman of Group 1 then would know that his only chance to be off on the first is with one of Group 4 or else in persuading one of the regular "day men" (substitutes) to work in his place.

When, as is preferable, the shift workers have cards of the type of FIGS. 2 and 3, which also are calibrated in fifty-six-day swing-shift cycles for the given year, each workman adjusts the indicia of his card at the beginning of the year. If the worker is in Group 1, the indicia on his card are as indicated in FIG. 1, with the numeral 1 of the endless band 5 opposite January 1st (the first letter of the abbreviation of January representing the numeral 1). If he is in one of the other groups he revolves the endless band 5 until his group number is in the position of numeral 1 in FIG. 2. Then all calibrated dates and shift-hour indications are properly adjusted for that particular group.

The endless band 5 is exampled as being mounted on the right-hand side of the card of stiff material (for example, cardboard) between the projections 6 and 7 of the card. This band 5 may be made of any suitable, flexible material - for instance, plastic or nylon or silk cloth or readily bendable paper. Preferably, it is made of plastic, cast or extruded in the form of an elongated cylinder. This cylinder is printed or punched to indicate the shift-hour numerals, shown as 3, 11 and 7 on the front and back card sides in the illustrated example and also to indicate pointers as part of the group indicia on the bands. Multiple endless bands of this type optionally may horizontally encompass the lower part of the indicator sheet of FIG. 1 - a band for each group and its shift indicia.

The card 8 is printed, then bent into a slight curve, thus allowing the endless band 5 to be installed in place over the low projection 6. The band is slightly larger in length than twice the distance of its track on the card portions between 6 and 7, and thus may be manually revolved on this track. It is held in its usual adjusted position by any suitable anchoring means - for example; a paper clip, or the illustrated band-clamping fastener which comprises the preferably resilient arm 9, rotatable with respect to the pivot 10. The arm 9 preferably has beveled edges (for easily and slightly lifting it between fingers). In adjustment of the group-indicating numerals and pointers, this arm 9 is slightly lifted and turned until it is clear of the band, and the band is then appropriately revolved on its track between the projections 6 and 7.

In use of this indicator of FIGS. 2 and 3, by a workman of Group 1, for example, to find workers of other groups with whom an exchange of a shift might be made, the member of Group 1, whose shift begins at 7 A.M., on January 13th, for instance, slightly lifts and turns and thus counteracts the clamping tendency of the preferably resilient arm 9, with his left hand. And then with his right hand he revolves the band 5 until the pointer 2 is opposite the date symbol for the first of January in the position previously occupied by the pointer 1. Then he realizes that Group 2 workers begin their shift at 3 p.m. and that probably no person in this group would want to work sixteen hours on the thirteenth. Therefore, he again moves the band on its track; until, for example, the pointer for Group 3 is horizontally opposite the January 1st indication. In this adjustment the shift hours of Group 3 are indicated as beginning at 11 P.M., January 12th and 13th, and in an exchange a Group 3 worker also would need to work sixteen hours. Have 8 hours off and return for duty on his regular 8 hour, 11 P.M. to 7 A.M. shift, January 13th. So the pointer of Group 4 is now moved to the top of the cards' front side, and the Group worker then realizes that Group 4 is off duty on the 13th and he approaches a Group 4 member for a possible exchange.

Of course, each worker also may easily ascertain his own shift hours at any date of the given year. And he may present cards, adjusted to indicate his shifts to his relatives or close associates.

FIGS. 4 and 5 illustrate optional modifications of the invention form of FIG. 1. In FIG. 4 provision is made for geometric identification of the groups. This method is of especial value to color-blind persons. For examples: Group 2 is indicated by the double line as well as the blue shift numerals: Group 3 by the red stripe and also by the fact that its horizontal line bisects the shift numerals; and other groups are otherwise indicated by geometrical variations. This FIG. 4 also indicates the fact that any number of shift groups may be shown on the placard or cards.

In FIG. 5 various optional ways of indicating the groups by encircled numerals in white or colored backgrounds are shown.

I claim:

1. A work-shift indicator, comprising:
a thin rectangular sheet of stiffly flexible material, capable of being marked with symbols;
calendar-like indicia on said sheet of the months, dates and days of the weeks of a given period, comprising a number of swing-shift cycles, the said calendar-like indicia being on both sides of said sheet and in a number of successive spaces equal to the number of days in said period, arranged in parallel lines and comprising a plurality of sets of date symbols, each of said sets being equal in number of symbols to the number of days in a swing-shift cycle and ending with an end of one of said parallel lines; and
an endless ribbon of flexible material, encompassing and in contact with said sheet, slidably and turnably mounted on and between two opposite edges of said sheet, having substantially the same width throughout its length and all around said sheet, and having an encompassing length substantially equal to twice the sum of the distance between said edges and the thickness of said thin sheet and sufficient clearance to allow sliding of the band on the sheet; the said band comprising an additional set of symbols indicating worker groups of said swing-shift cycles, spaced along the length of the ribbon, and comprising groups of successive figures indicating work-shift starting hours, spaced along the length of the ribbon, the said figure groups being separated from each other by off-duty spaces indicating days off of the said groups; part of the said successive figures being in a line on one side of said sheet and the other part of said successive figures being in a line on the other side of said sheet; the said figures and off-duty spaces also being in perpendicular lines that are normal to said parallel lines of the calendar-like indicia, each of the said perpendicular lines for each of the starting-hour figures and off-duty spaces in one adjusted position of said endless ribbon orthogonally intersecting a said parallel line of calendar-like indicia at an indicium indicating the day of said starting-hour figure or off-duty day of one of said groups, and in another, turned position of the ribbon indicating the day of said starting-hour figure or off-duty day of another of said groups.

2. An indicator as set forth in claim 1, in which: said parallel lines of calendar-like indicia and said lines of starting-hour figures and off-duty spaces are vertical; and said perpendicular lines are horizontal.

3. An indicator as set forth in claim 1, in which: said sheet has a recess at one of its ends and a similar recess at its opposite end; and the said turnable ribbon is mounted in and between said recesses.

4. An indicator as set forth in claim 3, further comprising means for securing said endless ribbon in a selective one of its adjusted positions.

5. An indicator as set forth in claim 3, in which the material of said sheet comprises stiff, bendable paper.

* * * * *